Jan. 13, 1925.
W. S. GOULD ET AL
1,522,719
STORAGE BATTERY
Filed June 5, 1924
2 Sheets-Sheet 1
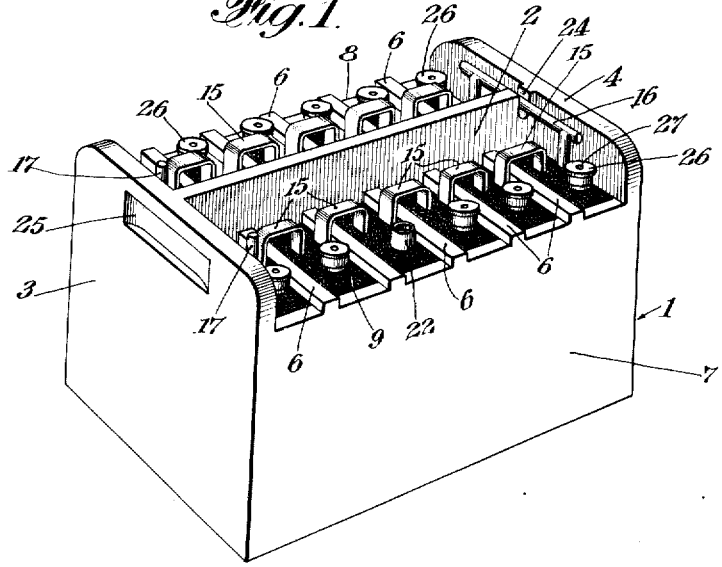
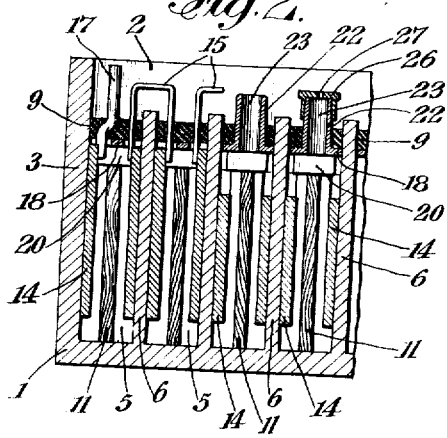
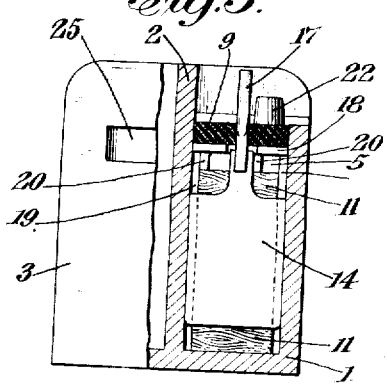
INVENTORS
William S. Gould
Raymond A. Klock
BY
Ward, Crosby & Smith
ATTORNEYS Jan. 13, 1925.
W. S. GOULD ET AL
1,522,719
STORAGE BATTERY
Filed June 5, 1924
2 Sheets-Sheet 2
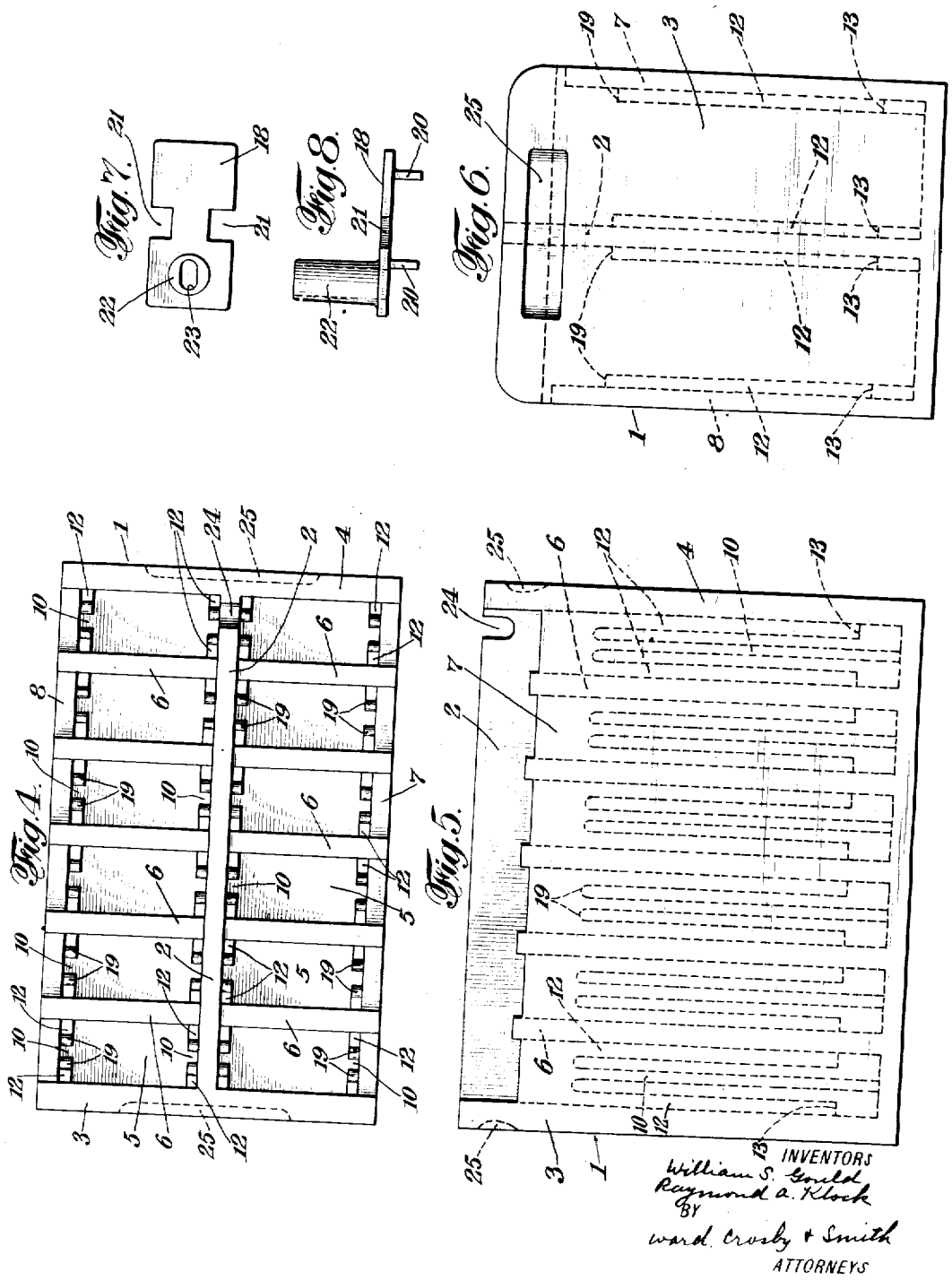
INVENTORS
William S. Gould
Raymond A. Klock
BY
Ward, Crosby + Smith
ATTORNEYS Patented Jan. 13, 1925.

1,522,719

UNITED STATES PATENT OFFICE.

WILLIAM S. GOULD, OF NEW YORK, N. Y., AND RAYMOND A. KLOCK, OF CLOSTER, NEW JERSEY, ASSIGNORS TO GOULD STORAGE BATTERY COMPANY, A CORPORATION OF NEW YORK.

STORAGE BATTERY.

Application filed June 5, 1924. Serial No. 717,943.

*To all whom it may concern:*

Be it known that WILLIAM S. GOULD, a citizen of the United States, and resident of New York city, county and State of New York, and RAYMOND A. KLOCK, a citizen of the United States, and resident of Closter, county of Bergen, and State of New Jersey, have invented certain new and useful Improvements in Storage Batteries, of which the following is a specification.

The invention relates to improvements in storage batteries and although the same may be found useful in storage batteries of various types, it is particularly applicable to portable storage batteries for use as B batteries in radio work. One objection to storage batteries for such work is that noise or interference is frequently set up in the wireless system due to stray of leakage currents caused by the presence of more or less of the electrolyte or moisture on the top surface of the $b$ battery, which currents even if so feeble as to be negligible in other work are nevertheless particularly objectionable in radio work. The object of the present invention is not only to provide a battery wherein it is possible to substantially eliminate such stray currents, but one wherein it is easy to clean the top surfaces of the cells of the battery to remove not only any electrolyte or moisture therefrom, but also to remove dirt and dust from the top of the cells thereby enabling the battery to be kept in better appearance. Further and more specific objects, features and advantages will more clearly appear from the detail description given below taken in connection with the accompanying drawings, which form a part of this specification.

In the drawings Fig. 1 is a perspective of a storage battery embodying my improvements in a preferred form thereof. Fig. 2 is a section taken through a few of the cells of the battery. Fig. 3 is an end view of the battery showing one of the cells in section. Fig. 4 is a plan view of the container for the battery. Fig. 5 is an elevation of the container for the battery. Fig. 6 is an end view of the container for the battery. Fig. 7 is a plan view for one of the cell covers, and Fig. 8 is an elevation of the cell cover shown in Fig. 7.

Referring to the drawings, 1 represents a liquid tight container, which in the present instance is made by molding the same from any suitable molding non-conducting acid resisting material, such for example as gummite. This container is provided with a longitudinal partition 2 extending between the end walls 3 and 4 and molded integral therewith of the same material and extending from the bottom of the container up to the top of the end walls 3 and 4 so as to firmly buttress and strengthen the container and at the same time divide it into two liquid tight compartments. These two compartments are in turn divided into a plurality of individual cell compartments 5 by means of partitions 6 arranged transversely of the container, one set of said partitions extending between one side wall 7 of the container and the longitudinal partition 2 and other set of transverse partition 6 extending between the longitudinal partition 2 and the other side wall 8 of the container. The partitions 6 on each side of the partition 2 are arranged in alignment so as to constitute in effect transverse partitions extending from one side wall of the container to the other, except for the dividing longitudinal partition 2. These partitions 6 are also preferably molded integral with the rest of the container and form with the walls of the container and the longitudinal partition 2 individual liquid tight cell compartments 5. The partitions 6 extend to a height such that they project above the level of the sealing compound 9 which seals the top of each cell compartment, while the side walls 7 and 8 extend only to the top of the sealing compound 9. The end walls 3 and 4 and the longitudinal partition 2, however, extend a considerable distance above the partitions 6. Each cell compartment 5 is provided at each end thereof with a vertical groove 10 extending to the bottom of the container forming guideways and locating means for the wood separators 11, which extend therein down to the bottom of the container. Each cell compartment 5 is also provided at each end thereof with two vertical grooves 12. The bottom of these grooves is located somewhat above the bottom of the container as indicated at 13. The grooves 12 are adapted to guide and hold in position the battery plates 14. Except at the ends of the battery, the positive plate in one cell is connected to the negative plate in the next cell by a lead strap conductor 15. At one end of the battery the negative and positive plates are connected together by a conductor 16 while the two terminal plates at the other end are shown as provided with terminal conductors 17. Placed in each cell 5 is a cell cover 18, the construction of which is shown in Figs. 7 and 8. Each cell cover is adapted to rest upon the top of the partitions 19 located between the grooves 10 and 12. Each cell cover 18 is provided with depending lugs 20 adapted to engage the top of and hold down in position the wood separators 11. Each cover is also cut away on its sides as indicated at 21 in Figs. 7 and 8 to provide a passageway therethrough for accommodating the conductors leading to the battery plates. Also each cover member 18 is provided with an upwardly extending projecting portion 22 having a vertical vent and filling opening 23 therethrough. The sealing compound 9 when in plastic condition is placed on the top of the cover members 18 in the respective cells and around the projection 22 so as to effectively seal the top of the various cell compartments except for the vent and filling openings 23. The connecting conductors 15 are of general U shape and are arched over but spaced from the partitions 6. The partition 2 is cut away as at 24 to accommodate the connecting conductor 16 and the ends 3 and 4 of the container are cut away as at 25 to provide suitable handholds. The vent and filling tube projections 22 project substantially above the sealing compound and have a sufficiently large opening therethrough to enable the battery to be easily replenished with electrolyte and at the same time avoid the spilling in handling. The tops of these projections are preferably normally covered by suitable soft rubber caps 26 which are provided with small vent openings 27 in the top thereof. The normal height of the electrolyte in the various cells is just above the tops of the separator plates 11. In replenishing the battery, a suitable filling tube containing for example, distilled water is inserted into the filling openings 23 and the distilled water deposited in the cell until the electrolyte reaches the proper height therein. If a cell should contain too much electrolyte, some may be withdrawn through the filling opening 23 by the usual rubber bulb filling tube. In case any electrolyte or liquid should be dropped upon the tops of the cells and thereby tend to form a conducting medium on the top of the sealing compound, the portions of the insulating partitions 6 which project above the sealing compound, will prevent continuous spread of electrolyte from the terminal of one cell to the terminal of the next which would permit the flow of stray currents and be extremely disadvantageous as above pointed out. Therefore, it is particularly important to have the transverse partitions 6 extend above the top of the sealing compound in the respective cells. In order, however, that any such liquid or dust and dirt may be easily removed from the top of the sealing compound in the respective cells, the side walls 7 are brought to a height substantially on the same level with the top of the sealing compound so that a cloth, sponge or brush may be conveniently used to wipe off the top of the sealing compound in each cell. That is, such means may be used to immediately wipe the dirt, etc., from the top of the sealing compound in each cell directly over the top of the side walls of the container since they do not extend above the top of the sealing compound, and thus permit the easy removal of dirt from the tops of the cells. The relatively high insulating partition 2 prevents any stray currents flowing between the terminals of the cells which are at relatively high difference of potential.

While we have described our improvements in great detail and with respect to a preferred form thereof, we do not desire to be limited to such details or forms since many changes and modifications may be made and the invention embodied in widely different forms without departing from the spirit and scope thereof in its broader aspects. We, therefore, desire to cover all modifications and forms coming within the language or scope of any one or more of the appended claims.

What we claim as new and desire to secure by Letters Patent is:

1. A storage battery comprising a container with a longitudinal partition and a plurality of transverse partitions dividing the container into a plurality of rows of battery cells, positive and negative plates and electrolyte in said cells, and a sealing compound sealing the tops of said cells, the top of the sealing compound being substantially on the same level as the side walls of the container and the transverse partitions extending substantially above the sealing compound and above the side walls of the container to tend to prevent leakage across the top of the cells from one cell to another while permitting the easy removal of dirt laterally from the tops of the cells.

2. A storage battery comprising a container and a longitudinal partition and a plurality of transverse partitions on each side of the longitudinal partition dividing the container into a plurality of rows of battery cells, positive and negative plates and electrolyte in said cells, and covering means closing the tops of said cells, the top of the covering means being of substantially the same height as the side walls of the container and the transverse partitions and longitudinal partitions extending substantially above the top of the covering means and above the side walls of the container, to tend to prevent leakage across the top of the cells from one cell to another while permitting the easy removal of dirt laterally from the tops of the cells.

3. A storage battery comprising a container with a longitudinal partition and a plurality of transverse partitions on each side of the longitudinal partition dividing the container into a plurality of rows of battery cells, positive and negative plates and electrolyte in said cells, and covering means closing the tops of said cells, the longitudinal partition extending substantially above the transverse partitions, the top of the covering means being of substantially the same height as the side walls of the container and the transverse partitions and longitudinal partition extending substantially above the top of the covering means and above the side walls of the container, to tend to prevent leakage across the top of the cells from one cell to another while permitting easy removal of dirt laterally from the tops of the cells.

4. A storage battery comprising a container with a longitudinal partition and a plurality of tranverse partitions on each side of the longitudinal partition dividing the container into a plurality of cells, the partitions and side and end walls of said container being molded integral, positive and negative plates and electrolyte in said cells, means covering the tops of the cells, including a layer of sealed compound, the longitudinal partition and end walls of the container being higher than the transverse partitions and side walls of the container, the top of the side walls of the container being no higher than the top of the sealing compound, and the transverse partitions extending materially above the sealing compound and side walls of the container, to tend to prevent leakage across the top of the cells from one cell to another while permitting the easy removal of dirt laterally from the tops of the cells.

5. A storage battery comprising a container with a longitudinal partition and a plurality of transverse partitions on each side of the longitudinal partition dividing the container into a plurality of battery cells, positive and negative battery elements and electrolyte in said cells and a sealing compound sealing the tops of said cells, the top of the side walls of the container being no higher than the top of the sealing compound and the transverse partitions extending materially above the sealing compound and side walls of the container, to tend to prevent leakage across the top of the cells from one cell to another while permitting the easy removal of dirt laterally from the tops of the cells.

6. A storage battery comprising a container, having a plurality of transverse partitions therein dividing the container into a plurality of battery cells, positive and negative plates and electrolyte in said cells, and means closing the tops of the cells including a sealing compound, the transverse partitions extending above said covering means, and a side wall of the container forming one end of said cells, and said ends being of substantially the same height as said covering means to permit easy removal of dirt, etc. laterally from the tops of the cells.

7. A storage battery comprising a container, having a plurality of transverse partitions therein dividing the container into a plurality of battery cells, positive and negative plates and electrolyte in said cells, and means covering the tops of the cells including a sealing compound, the transverse partitions extending above said covering means, and a side wall of the container forming one end for said cells, and said ends being of substantially the same height as said covering means to permit easy removel of dirt etc. laterally from the tops of the cell, and the end walls of the container extending substantially above said transverse partitions.

8. A storage battery comprising a container, having a plurality of transverse partitions therein dividing the container into a plurality of battery cells, positive and negative plates and electrolyte in said cells, and means covering the tops of the cells including a sealing compound, the transverse partitions extending above said covering means, and a side wall of the container forming one end for said cells, and said ends being of substantially the same height as said covering means to permit easy removal of dirt, etc. laterally from the tops of the cells, and the end walls of the container extending substantially above said transverse partitions, and said end walls being cut away to form hand holds.

9. A storage battery comprising a container having a plurality of transverse partitions therein forming a row of battery cells, positive and negative plates and electrolyte in said cells and means including a sealing compound covering the tops of the cells, the end walls of the container being substantially higher than a side wall of the container, and being cut away to form hand holds therein, and the transverse partitions extending above the top of said covering means.

10. A storage battery comprising a container having a plurality of transverse partitions therein forming a row of battery cells, positive and negative plates and electrolyte in said cells and means including a sealing compound covering the tops of the cells, the transverse partitions extending above the tops of said covering means, a side wall of the container forming one end for each of said cells and said ends being of substantially the same height as said covering means, and the opposite ends of said cells extending materially above said transverse partitions.

11. A storage battery comprising a container having a plurality of transverse partitions therein forming a row of battery cells, positive and negative plates and electrolyte in said cells and means including a sealing compound covering the tops of the cells, the transverse partitions extending above the tops of said covering means, a side wall of the container forming one end for each of said cells and said ends being of substantially the same height as said covering means, and the opposite ends of said cells extending materially above said transverse partitions, and the end walls of the container also extending materially above said transverse partitions and being provided with hand holds.

In testimony whereof we have signed our names to this specification.

WILLIAM S. GOULD.
RAYMOND A. KLOCK.

cells, positive and negative plates and electrolyte in said cells and means including a sealing compound covering the tops of the cells, the transverse partitions extending above the tops of said covering means, a side wall of the container forming one end for each of said cells and said ends being of substantially the same height as said covering means, and the opposite ends of said cells extending materially above said transverse partitions.

11. A storage battery comprising a container having a plurality of transverse partitions therein forming a row of battery cells, positive and negative plates and electrolyte in said cells and means including a sealing compound covering the tops of the cells, the transverse partitions extending above the tops of said covering means, a side wall of the container forming one end for each of said cells and said ends being of substantially the same height as said covering means, and the opposite ends of said cells extending materially above said transverse partitions, and the end walls of the container also extending materially above said transverse partitions and being provided with hand holds.

In testimony whereof we have signed our names to this specification.

WILLIAM S. GOULD.
RAYMOND A. KLOCK.

Certificate of Correction.

It is hereby certified that in Letters Patent No. 1,522,719, granted January 13, 1925, upon the application of William S. Gould, of New York, N. Y., and Raymond A. Klock, of Closter, New Jersey, for an improvement in "Storage Batteries," errors appear in the printed specification requiring correction as follows: Page 1, line 19, for the word "of" read *or;* same page, line 72, before the word "other" insert the article *the;* page 3, line 39, claim 4, for the word "sealed" read *sealing;* same page, line 74, claim 6, for the word "closing" read *covering;* and that the said Letters Patent should be read with these corrections therein that the same may conform to the record of the case in the Patent Office.

Signed and sealed this 17th day of February, A. D. 1925.

[SEAL.]

KARL FENNING,
*Acting Commissioner of Patents.*

Certificate of Correction.

It is hereby certified that in Letters Patent No. 1,522,719, granted January 13, 1925, upon the application of William S. Gould, of New York, N. Y., and Raymond A. Klock, of Closter, New Jersey, for an improvement in "Storage Batteries," errors appear in the printed specification requiring correction as follows: Page 1, line 19, for the word "of" read *or;* same page, line 72, before the word "other" insert the article *the;* page 3, line 39, claim 4, for the word "sealed" read *sealing;* same page, line 74, claim 6, for the word "closing" read *covering;* and that the said Letters Patent should be read with these corrections therein that the same may conform to the record of the case in the Patent Office.

Signed and sealed this 17th day of February, A. D. 1925.

[SEAL.] KARL FENNING,
*Acting Commissioner of Patents.*